United States Patent [19]

Heinlein et al.

[11] Patent Number: 5,950,217
[45] Date of Patent: Sep. 7, 1999

[54] COMPUTER NETWORK SYSTEM AND METHOD FOR PROCESS SAFETY MANAGEMENT (PSM) INCLUDING FACILITATOR DISPLAY AND MULTIPLE PARTICIPANT WORKSTATIONS

[75] Inventors: Philip David Heinlein, Binghamton; Carl Frank Ingersoll, Endwell; Gary Lee Mack, Vestal, all of N.Y.

[73] Assignee: International Business Machines Corporation, Armonk, N.Y.

[21] Appl. No.: 08/773,467

[22] Filed: Dec. 23, 1996

Related U.S. Application Data

[62] Division of application No. 08/274,059, Jul. 12, 1994, abandoned.

[51] Int. Cl.⁶ .................................................. G06F 15/00
[52] U.S. Cl. ............................................ 707/530; 707/511
[58] Field of Search .................................... 707/511, 530, 707/531, 540, 526; 345/329, 330, 331, 332; 395/200.34, 200.35

[56] References Cited

U.S. PATENT DOCUMENTS

| | | | |
|---|---|---|---|
| 4,019,027 | 4/1977 | Kelley | 235/89 R |
| 4,974,173 | 11/1990 | Stefik et al. | 345/331 |
| 4,975,840 | 12/1990 | DeTore et al. | 705/4 |
| 5,339,388 | 8/1994 | Bates et al. | 345/331 |
| 5,379,374 | 1/1995 | Ishizaki et al. | 345/331 |
| 5,423,038 | 6/1995 | Davis | 395/683 |
| 5,495,412 | 2/1996 | Thiessen | 705/1 |
| 5,537,546 | 7/1996 | Sauter | 395/200.6 |
| 5,586,252 | 12/1996 | Barnard et al. | 714/797 |
| 5,664,183 | 9/1997 | Cirulli et al. | 707/103 |
| 5,671,428 | 9/1997 | Muranaga et al. | 345/329 |
| 5,692,141 | 11/1997 | Kamisango et al. | 345/329 |
| 5,694,544 | 12/1997 | Tanigawa et al. | 345/332 |
| 5,732,200 | 3/1998 | Becker et al. | 395/114 |

OTHER PUBLICATIONS

Group Systems V, Basic Tools, Advanced Tools; Reference Manuals; Ventana Corporation (Jun. 1992).
Sales Literature; Ventana Corporation, p. 1 (Jun. 199).
Nunamaker, Jay F., "Meeting on Equal Terms: Electronically, Anonymously," Corporate Computing, V1,N1, p. 216(3) (Jul. 1992).
Laplante, Alice, "90's Style Brainstorming", Forbes, V152, N10, p. 44(8) (Oct. 5, 1993).
Stricoff, "International Conference and Workshop on Chemical Process Safety Management," EIM9106–024248 (abstract only) (May 1990).
Holzenthal et al., "Proceedings of the IEEE Southeastcon '93," EIP93101087018 (abstract only) (1993).
Page, "International Conference on Safety and Loss Prevention in the Chemical and Oil Processing Industries," EIM9109–045659 (abstract only) (Oct. 1989).
Chen et al., "Automatic Concept Classification of Text," Communications of the ACM 56–73 (Oct. 1994).
Donelan, J.G., "Using Electronic Tools to Improve Meetings," Management Accounting vol. 74, No. 9, pp. 42–45 (Mar. 1993).
"Could'Computerized Meetings' Be a Wave of the Future?," Business Travel News, p. A8 (Mar. 25, 1991).
Zigurs et al., "An Exploratory Study of Roles in Computer–Supported Groups," MIS Quarterly, vol. 18, No. 3, pp. 277–297 (Sep. 1994).

Primary Examiner—Stephen S. Hong
Attorney, Agent, or Firm—Ratner & Prestia; Arthur J. Samodovitz

[57] ABSTRACT

A computer network for gathering information and reaching consensus in a multi-user collaborative environment for Process Safety Management (PSM). Comments and ideas are gathered simultaneously from team members in a meeting, using the network. Apparatus is provided for storing these inputs and retrieving them from a database, and for printing them in predefined formats. The system provides for team members to submit their ideas anonymously in a meeting so that people uncomfortable with speaking in front of a group can freely share their ideas. The system automatically records input so ideas are not lost or misrecorded. The input is converted from the first database into a format for word processing to produce the required documents, into a format for a project management system to schedule the work to complete PSM documentation, and into a format to produce flow changes to the process being analyzed.

5 Claims, 7 Drawing Sheets

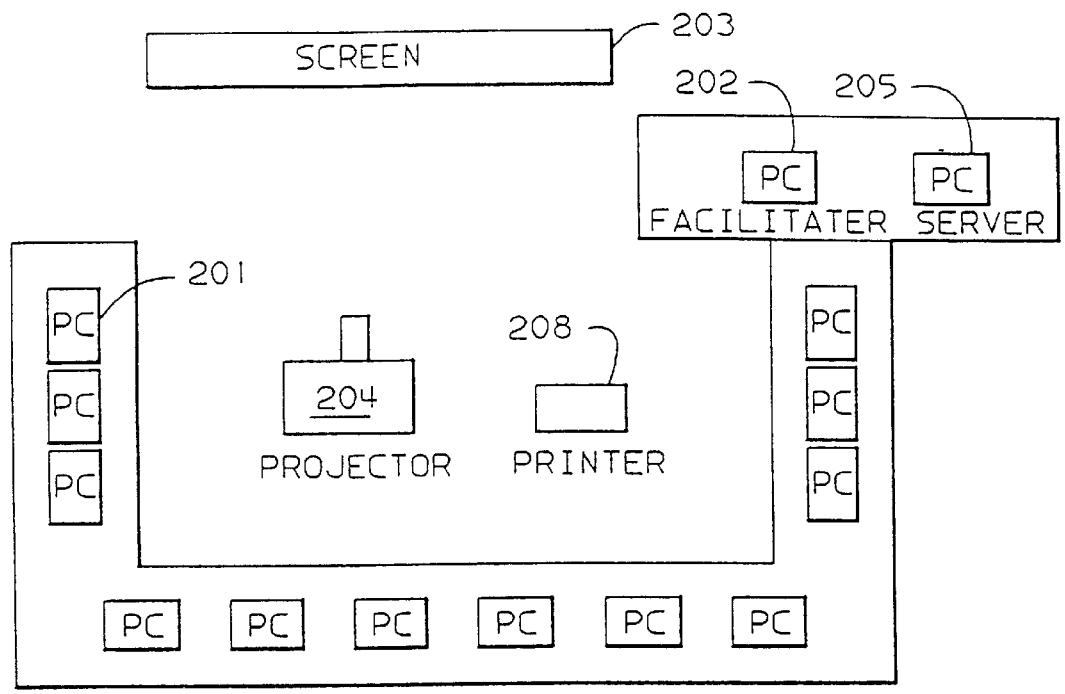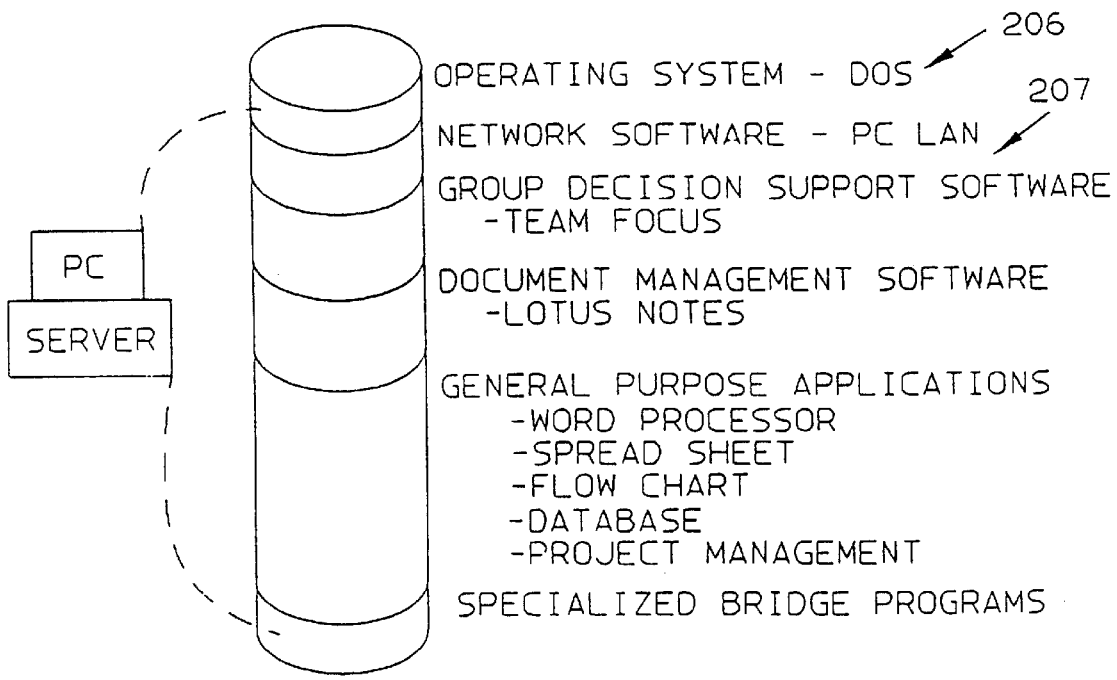
FIG. 2

PROCESS SAFETY MANAGEMENT
PSM OPERATING PROCEDURE SESSION

```
┌─────────────────────────────────────────────────┐
│ BUILD STRUCTURE OF PSM OPERATING PROCEDURE. IN  │
│   TEAMFOCUS GROUP OUTLINER OR GROUP WRITER.     │
│    LOAD TOPICS UNDER INTRODUCTION SECTION.      │
│  LOAD TOPICS UNDER PSM REQUIREMENTS BY ELEMENT  │
└─────────────────────────────────────────────────┘
                        │
                        ▼
┌─────────────────────────────────────────────────┐
│   SEND OUT TOPIC TO ALL PARTICIPANTS FOR        │
│       INDIVIDUAL RESPONSES-DETAILED             │◄──┐
│          VERBAGE FOR THAT TOPIC.                │   │
└─────────────────────────────────────────────────┘   │
                        │                             │
                        ▼                             │
┌─────────────────────────────────────────────────┐   │
│  REVIEW RESPONSES AND CONSOLIDATE INTO          │   │
│     A GROUP RESPONSE FOR THAT TOPIC.            │   │
│   GAIN CONSENSUS FROM ALL PARTICIPANTS.         │   │
└─────────────────────────────────────────────────┘   │
                        │                             │
                        ▼                             │
┌─────────────────────────────────────────────────┐   │
│  IF APPROPRIATE, IMPORT STANDARD TEXT FOR THE   │   │
│         TOPIC AND MODIFY AS NEEDED.             │   │
└─────────────────────────────────────────────────┘   │
                        │                             │
                        ▼                             │
                    ╱ MORE ╲    YES                   │
                   ╱ TOPICS ╲──────────────────────────┘
                   ╲   ?    ╱
                    ╲      ╱
                        │ NO
                        ▼
┌─────────────────────────────────────────────────┐
│     SAVE TEAMFOCUS SESSION TO DISKETTE.         │
│  RUN EXPORT UTILITY TO LOAD TEAMFOCUS           │
│    SESSION DATA INTO MICROSOFT ACCESS           │
│                 DATABASE.                       │
└─────────────────────────────────────────────────┘
                        │
                        ▼
┌─────────────────────────────────────────────────┐
│   RUN BRIDGE PROGRAM TO LOAD TEAMFOCUS          │
│     SESSION DATA INTO A WORD PROCESSOR.         │
│  PRODUCE PSM OPERATING PROCEDURE DOCUMENT.      │
└─────────────────────────────────────────────────┘
                        │
                        ▼
┌─────────────────────────────────────────────────┐
│     STORE PSM OPERATING PROCEDURE               │
│  DOCUMENT IN LOTUS NOTES FOR ACCESS             │
│       BY ALL APPROPRIATE PERSONNEL.             │
└─────────────────────────────────────────────────┘
```

FIG. 6

COMPUTER NETWORK SYSTEM AND METHOD FOR PROCESS SAFETY MANAGEMENT (PSM) INCLUDING FACILITATOR DISPLAY AND MULTIPLE PARTICIPANT WORKSTATIONS

This application is a division of application Ser. No. 08/274,059, filed Jul. 12, 1994, now abandoned.

A portion of the disclosure of this patent document contains material which is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever.

TECHNICAL FIELD OF THE INVENTIONS

These inventions relate to apparatus and methods for process safety assessments for proactive identification, evaluation, and elimination or mitigation of potential hazards in processes using toxic, flammable or explosive chemicals.

BACKGROUND

This section provides an introduction for those who are not skilled in the art and incorporates other citations by reference. It is not an admission regarding prior art.

In the late 1980's several application programs were developed to allow groups of people to work together by sharing information. These applications are referred to as GroupWare. GroupWare products run on a mainframe computer or on a network so that users can communicate in real time. Most GroupWare products provide one or more of the following functions:

shared calendaring—view another's electronic calendar and possibly schedule meetings on anothers calendar;

electronic mail—e.g. send messages to another's electronic mailbox even when the other person is not signed on;

shared word processing—e.g. allow multiple users to read and edit the same documents possibly simultaneously;

shared document control—e.g. automatically keep track of who, when and what changes are made to a document and allow previous versions to be compared to a current version;

shared data base management—e.g. allow multiple users to read and even write to the same data base; and group decision support—e.g. allow a group of users to communicate anonymously about some question and automatically tally votes to reach consensus.

For example, LotusNotes® (from Lotus, Inc.) provides shared calendaring, word processing of shared files, and electronic mail in a computer network; Group System V™ (from Ventana Corporation of MD) and TeamKit® (from IBM Corporation) offer anonymous email and a good email composing editor, and support group decision making by automatically tabulating anonymous voting.

Japanese patent JP 04-293157 describes a GroupWare application.

The Occupational Safety and Health Administration (OSHA) developed the process safety management (PSM) standard (1910.119). The objective of PSM is to prevent the undesired release of hazardous chemicals especially into locations which could expose employees and others to serious hazards. PSM is the proactive identification, evaluation, and mitigation or elimination of chemical hazards that could occur as a result of failures in design, procedures, or equipment of a process. Effective PSM requires a systematic approach to analyzing the entire process including: process design, process technology, operational and maintenance activities and procedures, non-routine activities and procedures, emergency preparedness plans and procedures, training programs and other elements which impact the process.

PSM targets highly hazardous chemicals that posses toxic, reactive, flammable or explosive properties which could potentially lead to a catastrophic incident. These substances are listed in paragraph A.1 of the PSM standard. The PSM standard requires an organization to develop a thorough, orderly, systematic approach for identifying, evaluating, and controlling processes involving these highly hazardous chemicals including the following specific requirements.

1. Set priorities and conduct analysis according to required schedules.

2. Use an appropriate methodology to determine and evaluate process hazards.

3. Address process hazards, previous incidents with catastrophic potential, engineering and administrative controls applicable to the factors, consequences of failure of controls, facility siting, human factors and a qualitative evaluation of possible safety and health effects of failure of controls on employees.

4. Perform process hazard assessment (PHA) by a team with expertise in engineering and process operations, the process being evaluated, and the PHA methodology used.

5. Establish a system to promptly address findings and recommendations, assure recommendations are documented and resolved, develop a written schedule for completing actions, communicate actions to operating, maintenance and other employees, and to perform and document the actions taken.

6. Update and reevaluate PHAs at least every five years.

7. Retain PHAs and updates for the life of the process.

PSM is a difficult and time-consuming process for an organization to implement. The typical approach is to assign individuals to ensure that the requirements of each section of the PSM standard are met, and teams of people to perform the PHA. The individuals become familiar with the standard, organize the work, structure the teams and assure education of the teams. The teams must be trained to perform the analysis. The teams need access and understanding of the operating procedures, emergency plans, chemical hazards and precautions, process chemistry, safe upper and lower limits of process variables, equipment safety systems, etc. All these documents must be controlled to assure that all the participants are working with the same version of the documentation. Members of the teams create parts of the documents which must be reviewed, commented on, revised and reviewed again until consensus is reached. OSHA investigators can come in at any time to ensure that the organization is in compliance with the PSM standard.

The above citations are hereby incorporated by reference.

OBJECTS OF THE INVENTION

It is an object of this invention to reduce the time from the beginning of PSM implementation until the PHA is complete and documented.

It is also an object to improve communication between members of the teams.

It is also an object to reduce the risk of errors being generated in the PHA and documentation to reduce the risk of errors being included in the final documentation.

Another object of this invention is to encourage participation by team members in analysis meetings to reduce the risk that important information will not be shared.

Finally, it is an object of the invention to reduce the time required (man hours) to perform PHA for a process.

SUMMARY OF THE INVENTION

The inventions of applicants include identification of problems inherent in manual methods of performing PHA and developing solutions to these problems which facilitate fast, accurate analysis of a processes.

In manual methods for participating in working team meetings, participation is hampered by the requirement of sequential communication and fear of making embarrassing mistakes in a group setting. Decision making is hampered by personal accountability for publicly taken positions. Group-Ware is used to overcome these problems by providing concurrent entry of information by multiple participants, and anonymous entry of information, and decision making by anonymous voting.

The invention comprises a computer network for gathering information in a multi-user collaborative environment in order to conduct PSM. The information includes input such as comments and ideas from team members participating in a session. Apparatus is provided for storing and retrieving these inputs from a data base as well as printing them in predetermined formats. The system provides for team members to submit their ideas anonymously in a meeting so that people uncomfortable with speaking in front of a group can share their ideas. The system provides automatic recording of input so ideas are not lost or mis-recorded and ideas are simultaneously entered saving valuable group time. Apparatus for automatic voting and tallying of votes is provided to allow consensus to be reached quickly.

Preferably apparatus is also provided to convert data from the input data base to a format for a word processing system to produce the required documents, a project management system to schedule the work (e.g. produce PERT charts), and a flow-charting system to produce process flow-charts.

In an initial work session a facilitator uses the system to prompt team members to simultaneously enter their ideas into the computer network regarding scope of work, resource management, prioritization of processes with highly hazardous chemicals, and a work plan. Then the facilitator prompts the members to reach consensus on these ideas and the facilitator transfers the ideas into a data base and uses a word processor to prepare a document from the ideas based on the group consensus.

In later work sessions for each process using the system in a similar manner, operating procedures, process flows and hazardous chemicals used in the process are input, stored and documented. The system is used to perform the PHA and create all the documents required for PSM. Finally the system is used to manage all the documents and to update and reevaluate the PHA every five years.

Other features and advantages of these inventions will become apparent from the following detailed description of presently preferred embodiments.

BRIEF DESCRIPTION OF THE DRAWINGS

FIG. 2 is a block diagram showing the layout of the system and applications available on the file server.

FIG. 6 illustrates the session of the invention for documenting the overall PSM Operating Procedures that address each section of the standard.

DESCRIPTION OF SPECIFIC EMBODIMENTS INCLUDING THE BEST MODE FOR CARRYING OUT THE INVENTIONS

Figure 1:
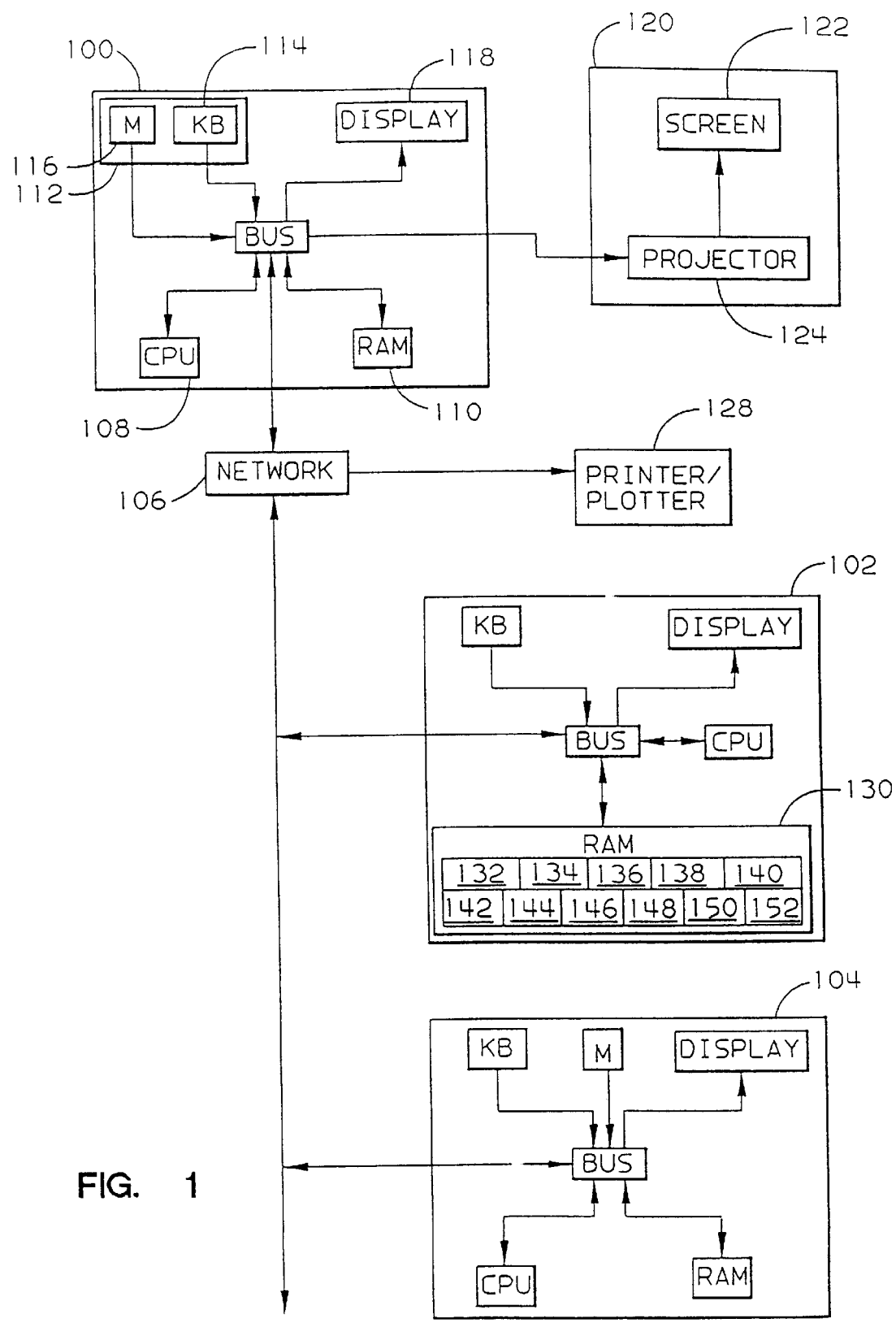
FIG. 1 is a block diagram showing a specific embodiment of the workstation network apparatus of the invention.

FIG. 1 is a schematic of the apparatus of the system for process safety management. Portable facilitator workstation 100 includes apparatus 112 for data input such as a mouse 116 or keyboard 114, a display such as an active matrix color LCD display 118, at least one central processing unit (CPU) 108, and hardware to direct the CPU to perform the functions of the process of the invention such as random access memory (RAM) 110 communicating with the CPU, which can be configured as apparatus to control the CPU and to control other functions of the workstation. The keyboard, display, CPU, and RAM are interconnected for example by at least one bus.

A multitude of portable member workstations 104 include apparatus for data input such as a mouse, pen, and/or a keyboard, a display such as a CRT or preferably an active matrix color LCD display, at least one central processing unit (CPU), and hardware to control the CPU such as read only memory ROM or preferably random access memory (RAM) which communicates to control the CPU and which can be configured as apparatus to control the CPU and other functions of the workstation. The keyboard, display, CPU, and RAM communicate for example by being interconnected by at least one bus.

A device for producing output such as a printer, floppy disk, or connection to an external database must be provided to permanently save the results of the session. Preferably paper output is produced by providing a plotter for flow charts and a text printer for text. More preferably a laser printer 128 produces both text and diagrams on paper or other sheet material. Computer network 106 connects facilitator workstation 100, printer 128, and all member workstations 104 together. The network can be electrical, optical, and/or by broadcast.

Apparatus 120 to display the information to the entire group (the facilitator and all the participants) is preferred. Screen 122 is sufficiently large and positioned to provide viability of several thousand characters of text displayed on the screen by all the members in the meeting (i.e. from each of the member workstations). Projector 124 is connected to the facilitator workstation or otherwise to the network, and positioned with respect to the screen to project an image which can preferably be seen from the workstations 104. Preferably the image is the same image as on the facilitator display.

Preferably, portable network server computer 102 is provided to control the network and store programs and data required in the session. The server may also include a keyboard for data entry (i.e. input) and an active matrix color LCD display. The server includes at least one CPU, and RAM 130 (having blocks of memory 132, 134, 136, 138, 140, 142, 144, 146, 148, 150, and 152). The keyboard, display, and hardware to control the CPU, such as RAM 130, communicate for example through at least one bus. The RAM can be configured as apparatus to control the CPU and other functions of the workstation, including: RAM 132 configured to control the functions of the server; and RAM 134 configured to control the flow of information between the facilitator workstation, the laser printer, and the member workstations over the network. Although control programs described herein can be implemented purely in permanent hardware such as ROM or even discrete components, configuring RAM is much preferred since programming RAM is much simpler than designing and producing hardware.

Initial Strategy Session

This initial facilitated work sessions provide education to all team members regarding the Process Safety Management Standard and its requirements. Some basic decisions are made regarding scope of the work, resource requirements, and prioritization of processes with highly hazardous chemicals. Also, a work plan is developed.

Referring to FIG. 2, the customer group gathers in a joint meeting to provide input in response to questions provided by a facilitator, shown as a PC 202. The PC server 205, operating system 206 and applications 207 are also shown. The session can also include a projector 204 and screen 203 for viewing and a printer 208 for hard-copy output. Each customer participates in the meeting via a PC 201 and the questions and answers may be selectively displayed on the screen or on each PC.

Figure 3:
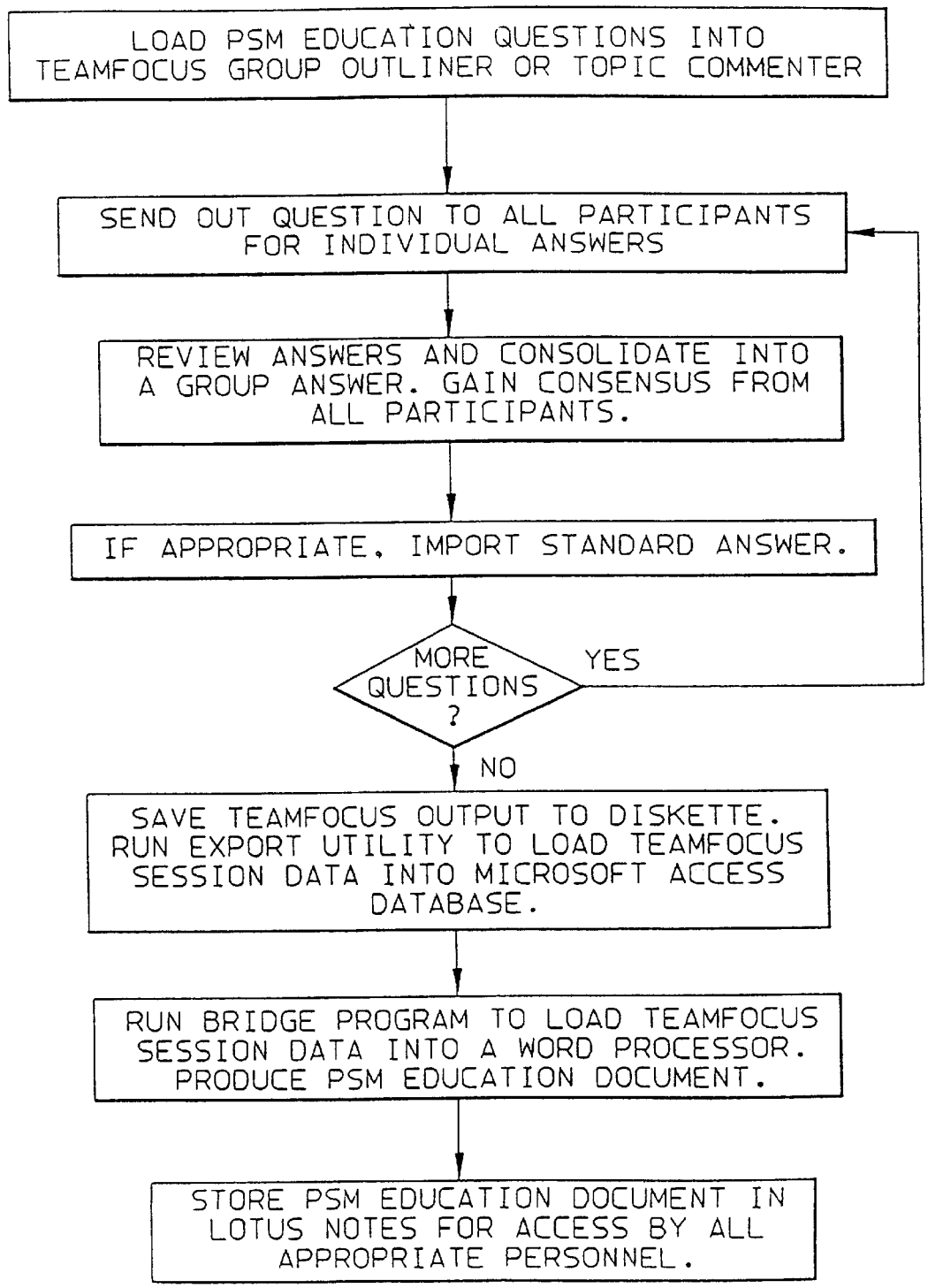
FIG. 3 illustrates the education exercise of the initial strategy session of the invention.

The Education Exercise in the Initial Strategy Session develops a PSM Education Document. In FIG. 3, the session starts with a series of questions loaded into TeamFocus® in the Group Outliner tool. The questions are designed to give the participants a common understanding of the PSM standard and its elements. They also guide the participants through the basic decisions that must be made to get started, such as scope, timing, and resource commitment. Questions are sent out to the group one at a time. Each member of the group provides an answer. The Group Outliner tool in TeamFocus® allows each participant to view the other participant's answers. When everyone has answered the question, the answers are reviewed and consolidated into a group answer. All participants must concur with the group answer. If the group cannot answer the question, a predefined answer can be imported and modified as needed. The facilitator can provide interpretation and instruction as needed, since PSM may be unfamiliar to some of the participants. This continues until all the questions have been answered. The TeamFocus® session output is copied to diskette and loaded into a word processor. The session output can either be formatted in the word processor tool or in a specialized program. In either case, a document is created and printed out for the participants. The document is also stored in another GroupWare tool called LotusNotes® where it can be accessed by others in the organization. The PSM Education document is reviewed with all appropriate personnel in the organization so that a common understanding and awareness of PSM is attained.

Figure 4:
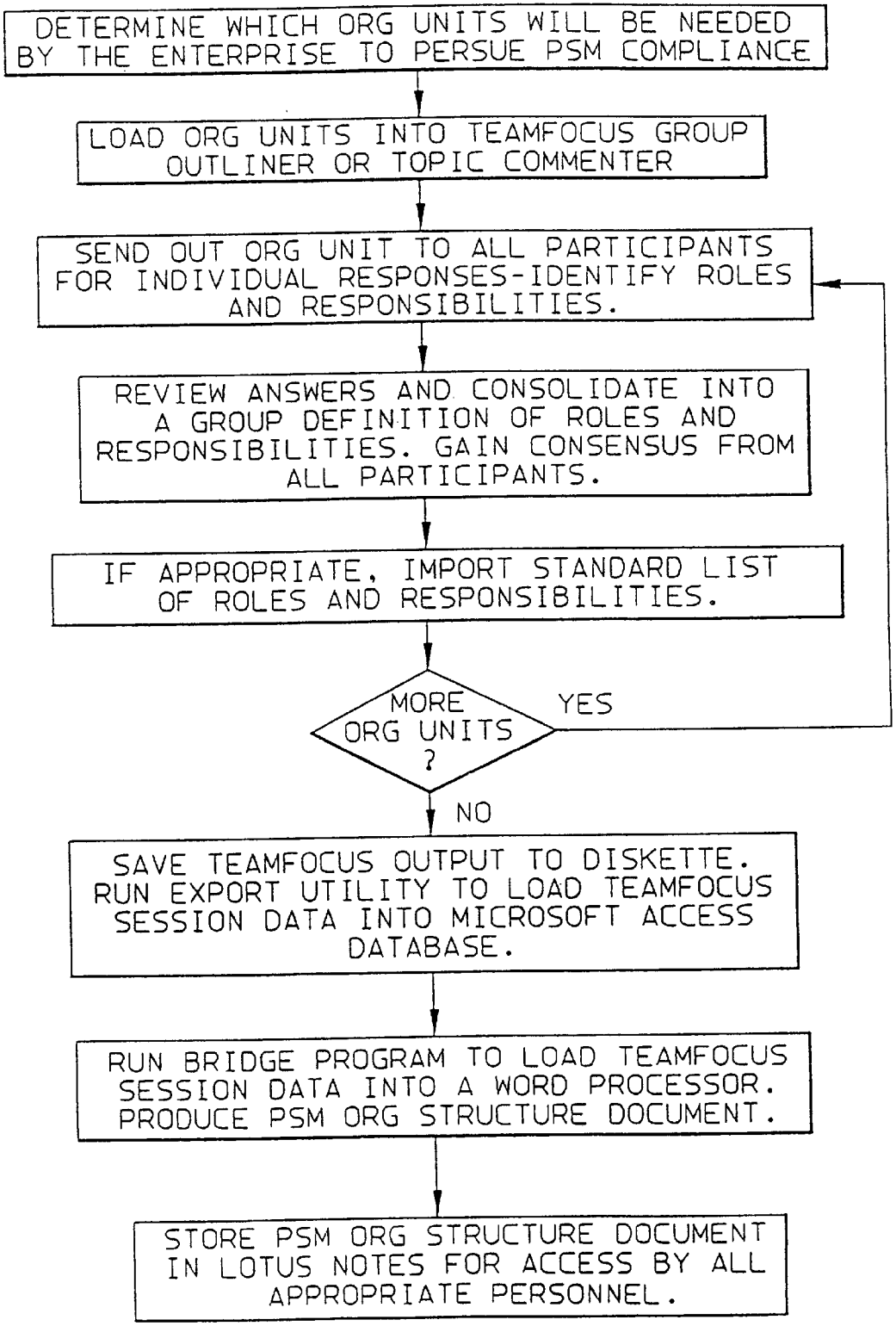
FIG. 4 illustrates the organizational structure exercise of the initial strategy session of the invention.

The organizational Structure Exercise in the Initial Strategy Session identifies the appropriate organizational units for PSM and documents the roles and responsibilities of each. In FIG. 4, the session starts with a list of organizational units that others have put in place to achieve compliance with the Process Safety Management Standard. These may include a management committee, a hazard review committee, process hazard review teams, etc. After some discussion, the participants decide which organizational units are required by their organization and these are loaded into TeamFocus® in the Group Outliner tool. The organizational units are sent out to the group one at a time. Each member of the group suggests roles and responsibilities for that organizational unit. The Group Outliner tool in TeamFocus® allows each participant to view the other participant's suggestions. When everyone has responded, the suggestions are reviewed and consolidated into a group definition of the roles and responsibilities for that organizational unit. All participants must concur with the group definition. If the group cannot define the responsibilities, a predefined set of responsibilities can be imported and modified as needed. The facilitator can provide interpretation and instruction as needed, since PSM may be unfamiliar to some of the participants. This continues until all the organizational units have been addressed. The TeamFocus session output is copied to diskette and loaded into a word processor. The session output can either be formatted in the word processor tool or in a specialized program. In either case, a document is created and printed out for the participants. The document is also stored in another GroupWare tool called LotusNotes® where it can be accessed by others in the organization. The Organizational Structure and roles and responsibilities show what the various teams must do and how they will interact with respect to PSM activities.

Figure 5:
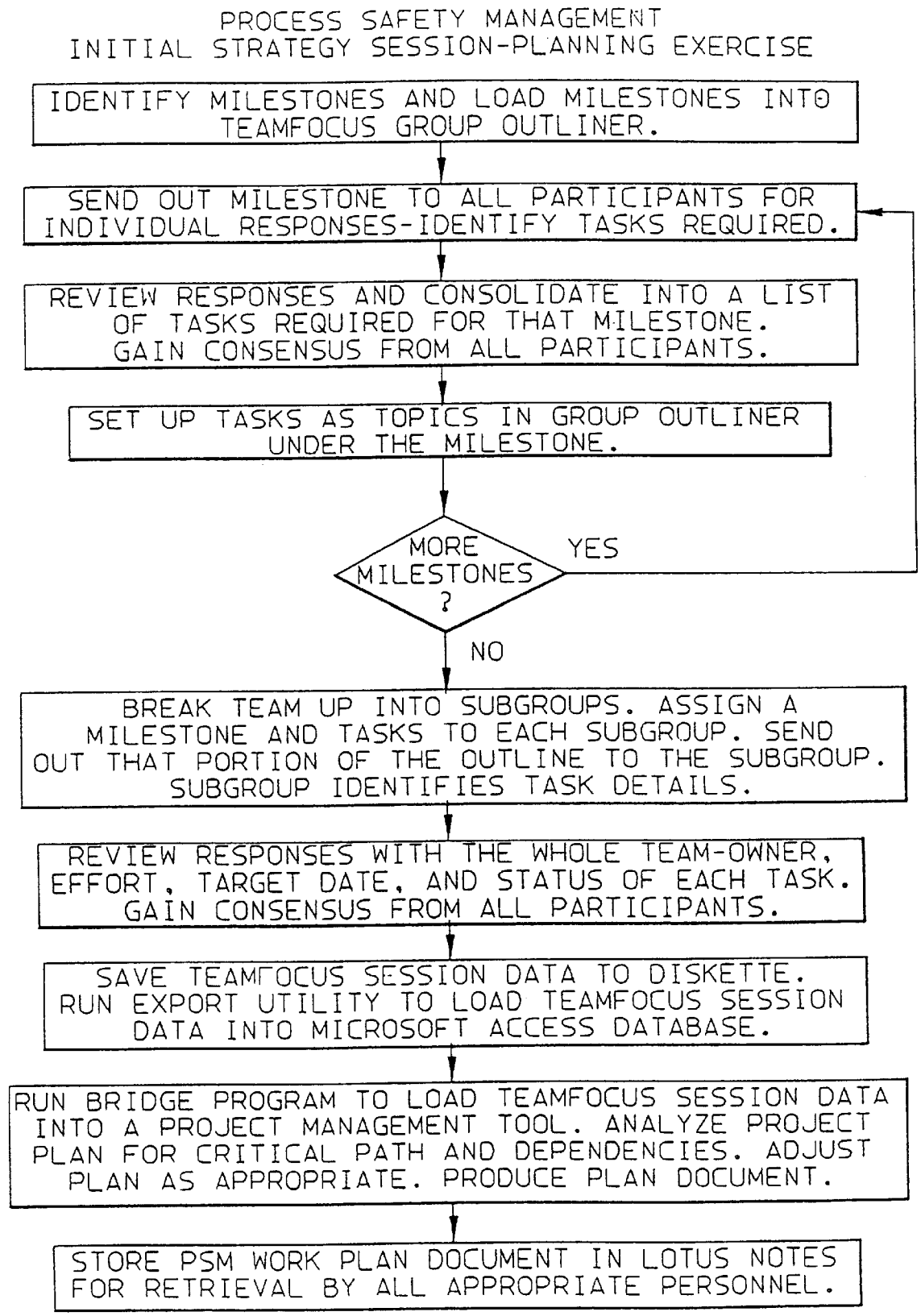
FIG. 5 illustrates the work planning exercise of the initial strategy session of the invention.

The Planning Exercise in the Initial Strategy Session identifies all the activities that must be accomplished in order to achieve compliance with the Process Safety Management Standard. In FIG. 5, the session starts with a list of milestones that typically have to be met in order to achieve compliance with the Process Safety Management Standard. These may include education, documentation, training, hazard review completion, etc. After some discussion, an approximate time-line is established for the various milestones and then the milestones are loaded into TeamFocus in the Group Outliner tool. The milestones are sent out to the group one at a time. Each member of the group suggests activities that must be accomplished to complete that milestone. The Group Outliner tool in TeamFocus® allows each participant to view the other participant's suggestions. When everyone has responded, the suggestions are reviewed and consolidated into a group list of activities for that milestone. All participants must concur with the group list of activities. If the group cannot define the activities, a predefined set of activities can be imported and modified as needed. The facilitator can provide interpretation and instruction as needed, since PSM may be unfamiliar to some of the participants. This continues until all the milestones have been addressed. At this time, the participants are divided into subgroups and each subgroup is assigned one or more milestones to work on. Each subgroup is sent the list of activities for their respective milestones using TeamFocus® Group Outliner tool. The subgroup identifies an owner, effort estimate, target date, and status for each activity. The responses are reviewed with the entire group for concurrence. The TeamFocus® session output is copied to diskette and loaded into a project management tool for analysis and tracking. The session output can either be formatted in the project management tool or in a specialized program. In either case, a master work plan is created and printed out for the participants. The work plan document is also stored in another GroupWare tool called LotusNotes® where it can be accessed by others in the organization. The Master Work Plan is reviewed with Management and used to track progress toward compliance with the Process Safety Management Standard.

PSM Operating Procedure Session

The PSM Operating Procedure Session develops a manual indicating how the organization is in compliance with each section of the Process Safety Management Standard. In FIG.

6, the session starts with a list of topics that are needed in the manual or operating procedure. These may include an Introduction, Definitions, and Requirements by Element.

After some discussion, the participants decide which topics are required by their organization and these are loaded into TeamFocus® in the Group Outliner or Group Writer tool. The topics are sent out to the group one at a time. Each member of the group suggests verbiage for that topic. The Group Outliner and Group Writer tools in TeamFocus® allow each participant to view the other participant's suggestions. When everyone has responded, the suggestions are reviewed and consolidated into a group response for that topic. All participants must concur with the group response. If the group cannot develop a response for the topic, a predefined response can be imported and modified as needed. The facilitator can provide interpretation and instruction as needed, since PSM may be unfamiliar to some of the participants. This continues until all the topics have been addressed. The TeamFocus session output is copied to diskette and loaded into a word processor. The session output can either be formatted in the word processor tool or in a specialized program. In either case, a document is created and printed out for the participants. The document is also stored in another GroupWare tool called LotusNotes® where it can be accessed by others in the organization. The PSM Operating Procedure shows how the organization meets the requirements of the Process Safety Management Standard.

Work Procedures Sessions

Figure 7:
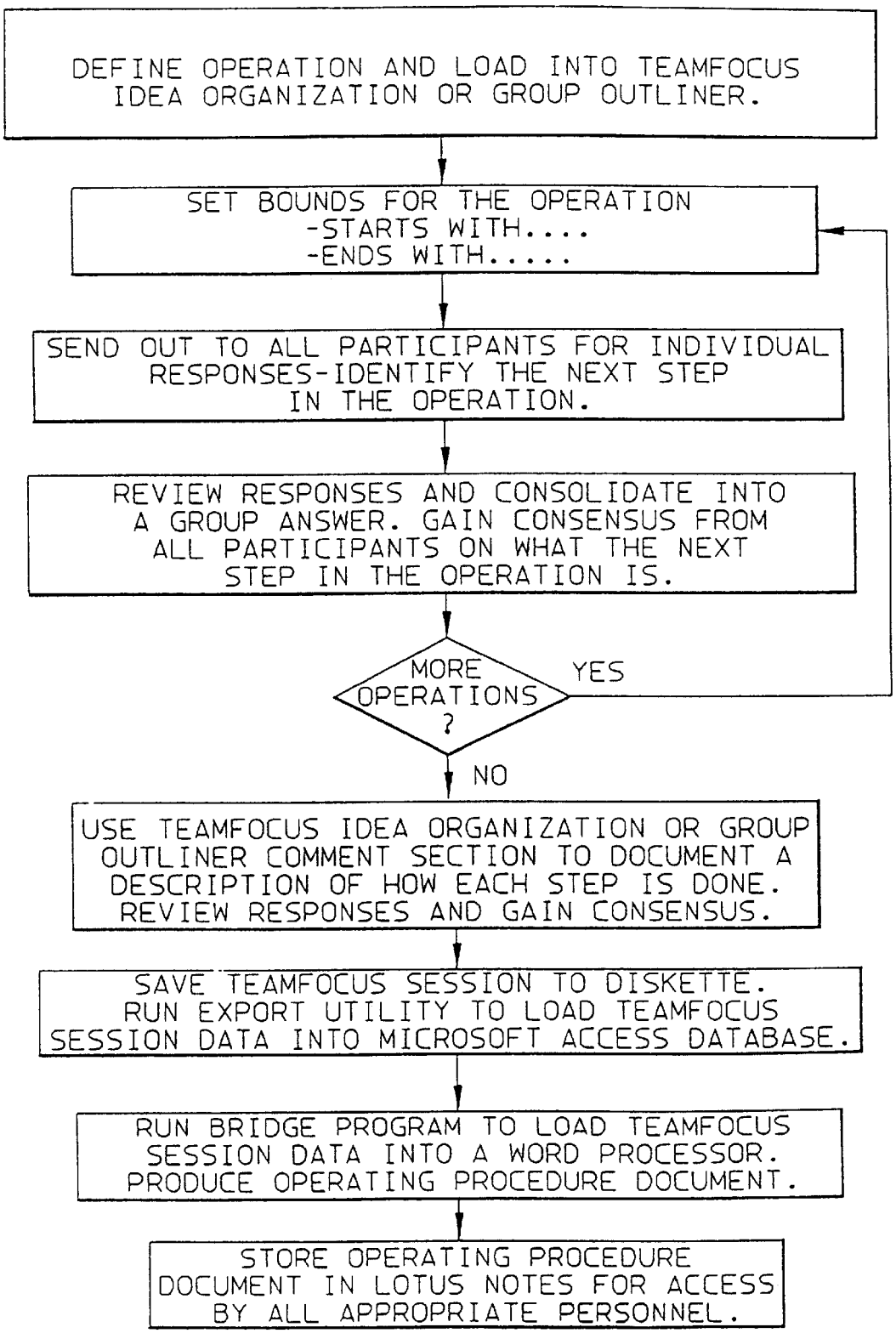
FIG. 7 illustrates the session of the invention for documenting operating procedures for a process.

The Work Procedure Session develops a written work procedure for an operation. In FIG. 7, the session starts with a definition of the operation that is loaded into TeamFocus® in the Group Outliner or Idea Organization tool. The group is then asked to identify the first step in this operation. Each member of the group suggests an activity. The Group Outliner and Idea Organization tools in TeamFocus® allow each participant to view the other participant's suggestions. When everyone has responded, the suggestions are reviewed, duplicates removed, and similar activities merged together. The resulting activities are then sequenced. All participants must concur with the sequence established by the group. The group is then asked to identify the next step in this operation. This continues until all the activities have been identified and sequenced. The group can then provide verbiage that describes how each activity is accomplished, either working in subgroups or all together. When this is completed, the TeamFocus® session output is copied to diskette and loaded into a word processor. The session output can either be formatted in the word processor tool or in a specialized program. In either case, a document is created and printed out for the participants. The document is also stored in another GroupWare tool called LotusNotes® where it can be accessed by others in the organization. The Work Procedure documents how the organization performs an operation. The Work Procedures can be used for training and for auditing.

Bridge Programs

The TeamFocus sessions produce data files comprised of all the groups' responses to the facilitator's prompts for information. Upon execution of the export programs, these files are formatted into dBase III format for import into database tools, such as Microsoft Access. An export file from the database tool can be used by other bridge programs to construct import files for various tools such as Microsoft Word. Reports and documents can be created from the TeamFocus tool, the database tool, or from the other software applications.

EXPORTGO

Table I shows a pseudocode embodiment of the invention for exporting data from the groupware database to a general purpose database.

TABLE I

EXPORT - EXPORT UTILITY FROM GROUPWARE TO DBASE III DATABASE

| Step | |
|---|---|
| 1 | PROMPT USER FOR PATH TO SESSION INFORMATION FILE AND VERIFY THAT IT EXISTS |
| 2 | FILL A LIST BOX WITH EACH SESSION NAME AVAILABLE |
| 3 | SET DEFAULT SOURCE AND DESTINATION PATHS AS CURRENT DIRECTORY |
| 4 | VERIFY USER SELECTIONS |
| 5 | OPEN THE OUTPUT DATABASE FILE |
| 6 | READ THE FIRST RECORD FROM THE TREE STRUCTURE FILE |
| 7 | AS LONG AS THERE ARE RECORDS IN THE INPUT FILE, DO THE FOLLOWING: |
| 8 | CHECK RECORD FOR 3 ASTERISKS |
| 9 | IF 3 ASTERISKS, THEN DO THE FOLLOWING: |
| 10 | START NEW SECTION IN ARRAY AND BUMP SECCTR BY 1 |
| 11 | READ THE NEXT 7 LINES AND ASSIGN TO SECNUM, PNODENUM, NUMNODES |
| 12 | PNODENAM, NODENAM, CHILDNUM, AND NODENUM |
| 13 | ELSE DO THIS |
| 14 | KEEP CURRENT SECNUM, PNODENUM, NUMNODES AND PNODENAM VALUES |
| 15 | ASSIGN CURRENT RECORD TO NODENAM |
| 16 | READ THE NEXT 2 LINES AND ASSIGN TO CHILDNUM AND NODENUM |
| 17 | END IF |
| 18 | LOOP BACK TO STEP (7) |
| 19 | DO FOR EACH SECCTR |
| 20 | IF LABEL FILE EXISTS FOR THAT SECTION, OPEN AND READ A RECORD |
| 21 | AS LONG AS THERE ARE RECORDS DO THE FOLLOWING: |
| 22 | READ PAIRED LINES FOR EACH NODE IN THE CURRENT SECTION AND |
| 23 | ASSIGN THE SECOND LINE TO THE COMFILE FIELD IN THE ARRAY |
| 24 | LOOP TO STEP (21) |
| 25 | LOOP TO STEP (19) |
| 26 | NOW LOOP THROUGH THE ARRAY AND WRITE THE RECORDS TO THE OUTPUT FILE |
| 27 | EXIT THE PROGRAM.-- |

Referring to Table I showing a pseudocode implementation of the bridge program EXPORTGO, this specialized program used by IBM bridges data from a TeamFocus Group Outliner (GO) session to a dBase III database file. The program begins with a prompt to the user to enter the path to the SESSION.DBF file created by TeamFocus. The program then verifies that the path entered is correct, and if so, reads the file to determine the names of all available sessions. These are entered into a list box control on the main form. The default source and destination paths are set as the current directory. They can be changed by the user if need be. The user can select as many sessions as desired to be exported. When OK is clicked, the EXPORTGO program validates all data fields entered by the user. If all is valid, the Session Id for the first selected session is used to determine input file names. The file containing the GO tree structure is named "TREE_x.GO" where x is the Session Id. An entry of 3 asterisks separates each outline section in the file. When a new section is encountered, 7 lines are read and assigned to the variables secnum, pnodenum, numnodes, pnodenam, nodenam, childnum, and nodenum. If the line after these 7 is not 3 asterisks, then the record is another from the current section of the outline. Secnum, pnodenam, numnodes, and pnodenam stay the same as the current node. The current line is assigned to nodenam and 2 more lines are read into childnum and nodenum. This logic is repeated for the entire TREE_x.GO file until empty. The number of sections read is counted and saved. Next, for i=1 to the number of sections read, an attempt ismade to open file L_x-i.GO, where x is the Session Id. If the file exists, then for the number of nodes in the current section, the following is done: read two lines, the second being the comment file name, and assign to comfile. A loop is performed. Then the records are written to the DBase III file.

BOOKMSTR Bridge

Table II shows a pseudocode embodiment of the invention for exporting data from the groupware database to a word processor database.

TABLE II

APPLICATION DEVELOPMENT WORKSTATION

* BOOKMASTER BRIDGE PROGRAM (FOR IBM'S WORD PROCESSOR-BOOKMASTER)
INITIALIZE PROGRAM VARIABLES
VERIFY INPUT FILES EXIST
BUILD TITLE PAGE
WRITE DOCUMENT TITLE
WRITE DOCUMENT REVISION LEVEL
WRITE DATE/TIME
WRITE DOCUMENT OWNER NAME AND ADDRESS
BUILD DOCUMENT BODY
START NEW PAGE
WRITE LEVEL 0 ENTRY
FOR EACH COMMENT
START NEW PARAGRAPH
WRITE COMMENT
FOR EACH LEVEL 1 ENTRY
START NEW PAGE
WRITE ENTRY TITLE
FOR EACH COMMENT
START NEW PARAGRAPH
WRITE COMMENT
FOR EACH LEVEL 2 ENTRY
START NEW PARAGRAPH
WRITE ENTRY TITLE
FOR EACH COMMENT
START NEW PARAGRAPH
WRITE COMMENT
FORMAT DOCUMENT
(EXECUTIVE WORD PROCESSOR PROGRAM)
PRINT DOCUMENT
(ISSUE OPERATING SYSTEM PRINT COMMAND)
SAVE DOCUMENT
(ISSUE OPERATING SYSTEM COPY COMMAND)
EXIT--

Referring to Table II showing a pseudocode implementation of the bridge program BOOKMSTR, this specialized program used by IBM bridges data from a TeamFocus Group Outliner (GO) session to IBM BookMaster, a word processing product. The program begins with the initialization of program variables and checks to make sure the TeamFocus files exist. The TeamFocus files are of 3 types: one showing the overall structure, another type for each of the level entries, and another type for the comments associated with each of the level entries. The program first constructs a title page for the document. It uses the TeamFocus session name as the document title, and prompts for the name of the document owner. It also writes the current system date and time on the document title page, as well as an initial revision level of 1.0. The standard BookMaster title tags, ":title.", ":docnum.", "date.", and ":author.", are used here. Next, the program constructs the body of the document by writing out the TeamFocus files, starting with the level 0 entry and its associated comment file. The level 0 entry is given a ":h1" tag to indicate that it is the highest level heading in the document. Then it starts a new page by issuing a ".pa" tag and writes out the first level 1 entry and its associated comment file. The level 1 entry is given a ":h2" tag to indicate that it is the second highest level heading in the document. Each individual comment in the comment file is treated as a separate paragraph by preceding it with a ":p" tag. If there are level 2 entries, it next writes out each level 2 entry and its associated comment file as before. Each level 2 entry is given a ":h3" tag to indicate that it is the third highest level heading in the document. Then it starts a new page by issuing a ".pa" tag and writes out the next level 1 entry and its associated comment file. This continues until all of the level 1 entries have been written. At this point, the program calls the BookMaster executable program to format the document using the above arranged tags and text. The document is sent to the printer and the file is copied to a designated output directory.

WORKBNCH Bridge

Other bridge programs can similarly be written for other software applications such as flow-charting tools. The advantages offered by the bridge programs are in time saving and accuracy, as the data need not be manually keyed into each tool.

ADVANTAGES

The combination of facilitated work sessions and GroupWare products, when applied to the Process Safety Management Standard, allows an organization to optimize its resources to achieve compliance with the standard in less time than it would otherwise have required. The facilitated work sessions allow the work teams to focus their efforts and make effective use of their time. They also promote teamwork and ownership of process safety operating procedures. The GroupWare tools allow the work team to quickly collect, organize, and document their ideas. At the end of the facilitated session, the team has immediate documentation of their work, which can be loaded into other software packages for further analysis. The GroupWare tools also allow for the proper management of the documentation, making immediate access throughout the organization possible.

ALTERNATIVE EMBODIMENTS

All of the work described above can be performed by individuals or groups working in traditional fashion, that is, without the aid of a facilitator and GroupWare tools. Work done by individuals must be reviewed by others in order to assure correctness. Numerous iterations of drafts and reviews are generally required before all parties concur with the decision or document. These iterations require time. Facilitated work sessions utilizing GroupWare tools improve the process by avoiding the iterations and involving the right people up front.

Work done by groups often lacks in quality because of unequal participation among team members. Typically a small percentage of the group dominate the discussions and exert undue influence over the resulting decision or document. Other members of the group may not buy into the resulting decision or document as a result. The implications of this generally don't show up until later on when recommended actions are not taken. Again, time is required to sort this out and correct the problem. Rework is often required to document the decision or process so that everyone is in agreement. Facilitated work sessions utilizing GroupWare tools improve the process by giving everyone an equal voice and gaining consensus up front.

The process described in the example above is not the only alternative for integrating GroupWare and the Process Safety Management Standard. Other GroupWare tools exist besides TeamFocus® and can be used in its place. Other Project Management tools exist besides Applied Business Technology® and can be used in its place. Other Word Processing tools exist besides IBM BookMaster and can be used in its place.

It will be appreciated that, although specific embodiments of the invention have been described herein for purposes of illustration, various modifications may be made without departing from the spirit and scope of the invention. Accordinly, the scope of protection of this invention is limited only be the following claims and their equivalents.

We claim:

1. A computer network system implementing a project safety management (PSM) standard, comprising:

a facilitator workstation with a facilitator display and data input means for inputting data into the system;

multiple participant workstations with participant displays and data input means for inputting data anonymously into the system, and each workstation having means to control the functions of the workstation;

team display means communicating with the facilitator workstation for displaying several thousand characters of text simultaneously to a plurality of participants;

network means for communication between the facilitator workstation and a plurality of the participant workstations;

automatic means to control the communication between the facilitator workstation and a plurality of the participant workstations, and to control the functions of the facilitator workstation;

collection means to automatically collect data from a plurality of participant workstations simultaneously input at a plurality of input means and to display the received data simultaneously to a plurality of participants, and to provide for revising the data to resolve any inconsistencies in the received data and to reach consensus;

database means for storing and retrieving data;

means for categorizing and organizing the data collected from the participants by the collection means and transmitting the organized data to the database means;

word processing means for additional input and organization of the data transmitted to the data base into one or more documents;

means for retrieving the data from the database and further organizing the data for use in the word processing means; and programmed means for retrieving pre-loaded organizational unit descriptions that others have used to achieve compliance with the PSM standard, and which are loaded with such descriptions, and for displaying the organizational unit descriptions using team display means and for storing a selection of organizational units selected by input into member workstations for implementing the PSM standard.

2. The system of claim 1 further comprising, programmed means for storing for each selected organizational unit, roles and responsibilities selected by group consensus from data pre-loaded in the system before the group meeting or from input from member workstations during a group meeting.

3. A method for using a computer network for organizational planning to implement a project safety management (PSM) standard, comprising the steps of:

pre-loading a list of example organizational units and example roles and responsibilities of each group in performing PSM into a computer network for display during a group meeting;

selecting members of a group for participation in a facilitated, automated group meeting;

in a group meeting inputting commands into a facilitator workstation to display the list of organizations simultaneously to a plurality of members of the group;

describing the organizations and their relations to the members of the team;

reaching consensus on the selection of organizations that will be involved in PSM;

for each selected organization performing the steps of:

inputting commands into a facilitator workstation to display an organization name and the role and responsibilities of the organization simultaneously to a plurality of members of the group;

simultaneously inputting roles and responsibilities of the organization into multiple member workstations by participants;

simultaneously displaying a plurality of the roles and responsibilities, entered at other workstations at a plurality of member workstations; and reaching consensus on the roles and responsibilities of the organization.

4. The method of claim 3 further including the steps of:

loading data including the list of organizations, pre-loaded roles and responsibilities and comments into a word processor data base;

editing the data depending on the consensus reached to create a report; and printing copies of the report for members of the group from the word processor data base and distributing the copies.

5. The method of claim 3 in which the organizations include:

a management committee, a hazard review board, and a process hazard review team.

* * * * *